United States Patent [19]

Edminster

[11] Patent Number: 4,708,511

[45] Date of Patent: Nov. 24, 1987

[54] AXIAL MOVEMENT BLOCKING APPARATUS

[75] Inventor: Robert E. Edminster, Scottsdale, Ariz.

[73] Assignee: Motorola, Inc., Schaumburg, Ill.

[21] Appl. No.: 889,447

[22] Filed: Jul. 23, 1986

[51] Int. Cl.⁴ .............................................. F16B 7/00
[52] U.S. Cl. .................................... 403/316; 403/324; 403/378
[58] Field of Search ...................... 403/345, 12, 19, 11, 403/109, 196, 261, 315, 319, 321, 322, 326, 327, 376, 378, 379, 354, DIG. 4, 316, 317, 324, 155

[56] References Cited

U.S. PATENT DOCUMENTS

| | | | |
|---|---|---|---|
| 1,790,238 | 1/1931 | Klein | 403/324 X |
| 3,253,310 | 5/1906 | McCarthy | 403/326 |
| 3,649,057 | 3/1972 | Urciola | 403/261 |
| 3,854,832 | 12/1974 | Cowper | 403/354 |
| 3,969,033 | 7/1976 | Recker | 403/19 |
| 4,169,687 | 10/1979 | Schull | 403/109 |
| 4,392,759 | 7/1983 | Cook | 403/317 X |
| 4,448,564 | 5/1984 | Orszulak | 403/324 X |
| 4,459,785 | 7/1984 | Zimmer | 403/348 |

Primary Examiner—Andrew V. Kundrat
Assistant Examiner—Peter M. Cuomo
Attorney, Agent, or Firm—Lowell W. Gresham

[57] ABSTRACT

A movement blocking apparatus having an inner locking ring rotatably mounted within a housing is disclosed. The housing contains slits which, in a locked position, align with inclined plane portions of the locking ring. Notches reside axially adjacent to the inclined plane portions of the locking ring. A blocking pin, which blocks movement of a shaft, is inserted in the housing slits, causing the locking ring to rotate away from the locked position due to operation of the blocking pin against the inclined planes. When the blocking pin has been inserted into the slits far enough to engage the locking ring notches, a spring causes the locking ring to return to the locked position and entrap the blocking pin.

17 Claims, 5 Drawing Figures

4,708,511

AXIAL MOVEMENT BLOCKING APPARATUS

BACKGROUND OF THE INVENTION

This invention relates generally to devices which selectively prevent axial movement of a shaft. More specifically, the present invention relates to an apparatus and a method for utilizing a blocking pin to prohibit movement of the shaft in one direction along the shaft's axial dimension.

The use of blocking pins as safety devices is known in the art. Typically, potentially dangerous or damagable objects utilize blocking pins to prevent a movement of some portion of the object while the object is being handled or transported. The restriction of movement for a portion of the object lessens dangers associated with the object or the risk of damage to the object. Later, when the object is ready for service, the blocking pins may be removed to permit free movement of previously blocked portions of the object.

One known technique for utilizing blocking pins to prevent axial movement of a shaft makes opposing holes through walls of a sleeve that surrounds an end portion of the shaft. A blocking pin is then threaded through the opposing holes. The blocking pin is restrained by the surrounding sleeve. Thus, the blocking pin in conjunction with the sleeve blocks movement of the shaft past the blocking pin.

Although this technique works well in many applications, it exhibits problems which prevent its use in other applications. For example, the threading of a blocking pin through opposing holes in a sleeve may be a difficult and time consuming task under normal circumstances. This problem becomes exaggerated under adverse environmental conditions, such as darkness or cold weather where one may wear gloves while attempting to install the blocking pin. Additionally, in the above technique a sleeve must extend far enough away from the body of the object to allow sufficient access to the opposing holes so that the blocking pin may successfully be threaded. A high profile results, and the high profile may impede mounting the object into a machine which utilizes the object.

SUMMARY OF THE INVENTION

Accordingly, it is an object of the present invention to provide an improved movement blocking apparatus which utilizes a blocking pin.

Another object of the present invention concerns providing an improved movement blocking apparatus in which a blocking pin is easily installed, even under adverse environmental conditions.

Yet another object of the present invention concerns providing an improved movement blocking apparatus which permits a low profile relative to an object which employs the present invention.

Still another object of the present invention concerns providing an improved movement blocking apparatus which is simple, inexpensive, and reliable throughout widely varied environmental conditions.

The above and other objects and advantages of the present invention are carried out in one form by an apparatus which blocks movement of a shaft in a direction of the shaft's axis when a blocking pin is installed. The apparatus contains a housing, a locking ring, and a resilient member. The shaft, housing, and locking ring all reside concentrically around the shaft's axis. The housing has an axial slit extending from an end of the housing. The locking ring is formed to have an inclined plane portion which extends from an end of the locking ring to a notch which is located adjacent to an opposing end of the inclined plane. Further, the locking ring is rotatably mounted relative to the housing, and a resilient member couples to the housing and the locking ring to urge the locking ring to rotate relative to the housing.

BRIEF DESCRIPTION OF THE DRAWINGS

A more complete presentation of this invention may be found in the detailed description and claims when considered in connection with the accompanying drawings, in which like reference numbers indicate similar parts, and wherein:

DETAILED DESCRIPTION OF THE PREFERRED EMBODIMENT

Figure 1:
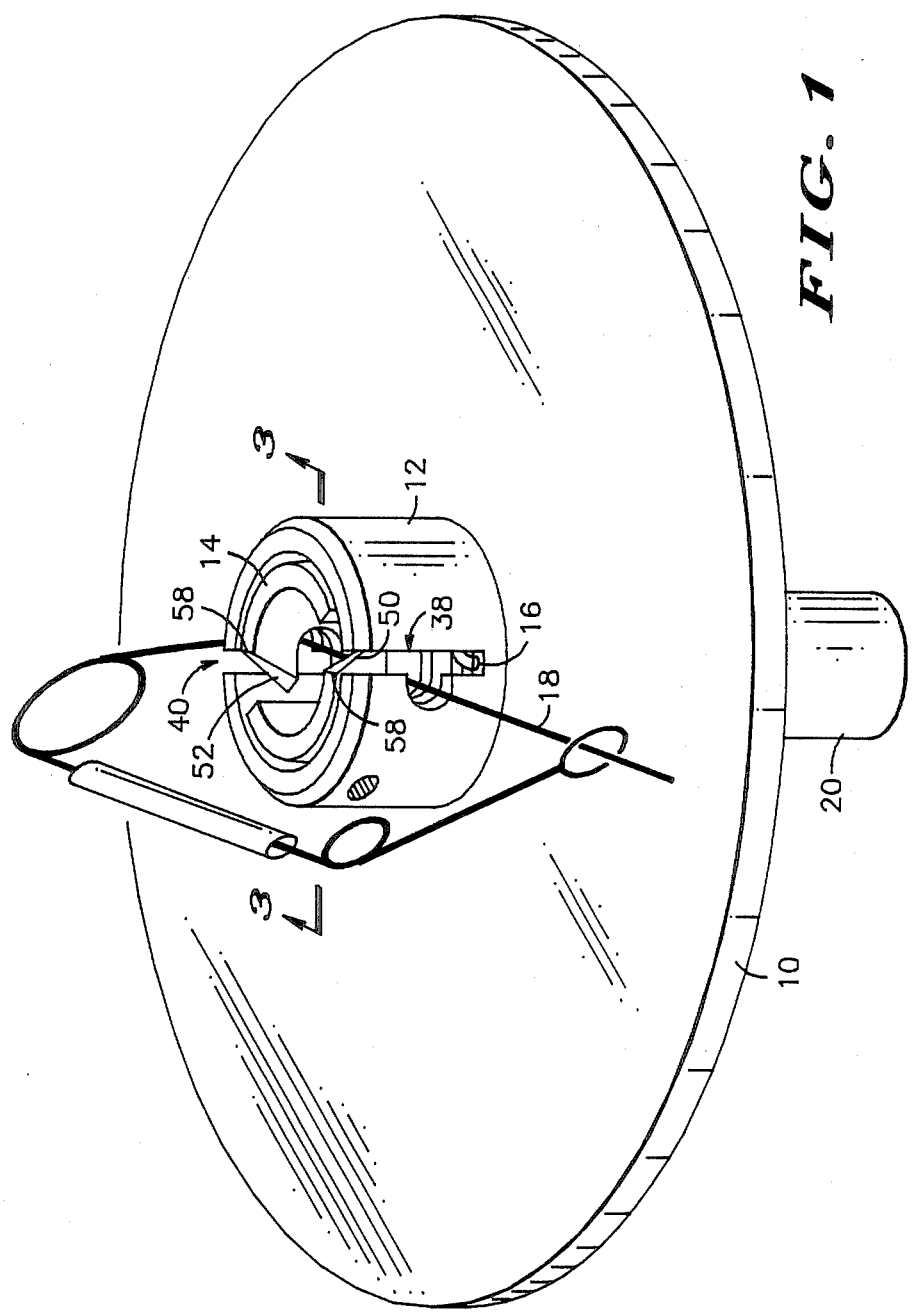
FIG. 1 shows a perspective view of a movement blocking apparatus constructed according to the teaching of the present invention.

FIG. 1 shows a perspective view of the present invention. In FIG. 1, the present invention is assembled and installed. An object or base 10 represents the member against which movement of a shaft 20 is blocked. A housing 12 rotatably mounts on base 10, and a locking ring 14 rotatably mounts within housing 12. A resilient member, such as torsion spring 16, couples between housing 12 and locking ring 14 to urge locking ring 14 to rotate relative to housing 12. A blocking pin 18 is shown installed within locking ring 14 and housing 12 so that blocking pin 18 is restrained from moving in axial or circumferential directions relative to housing 12 and locking ring 14.

In the present invention shaft 20 represents a member which moves along the shaft's axial dimension. However, as shown in FIG. 1, movement of shaft 20 in its axial direction may selectively be blocked by installation of blocking pin 18. Blocking pin 18 cannot move in the axial direction because it is restrained by locking ring 14. Thus, if shaft 20 is urged to move in its axial direction past blocking pin 18, blocking pin 18 is placed in shear. Consequently, materials used in selecting blocking pin 18 withstand all shear forces placed on blocking pin 18 by shaft 20 without significant deformation.

Figure 2:
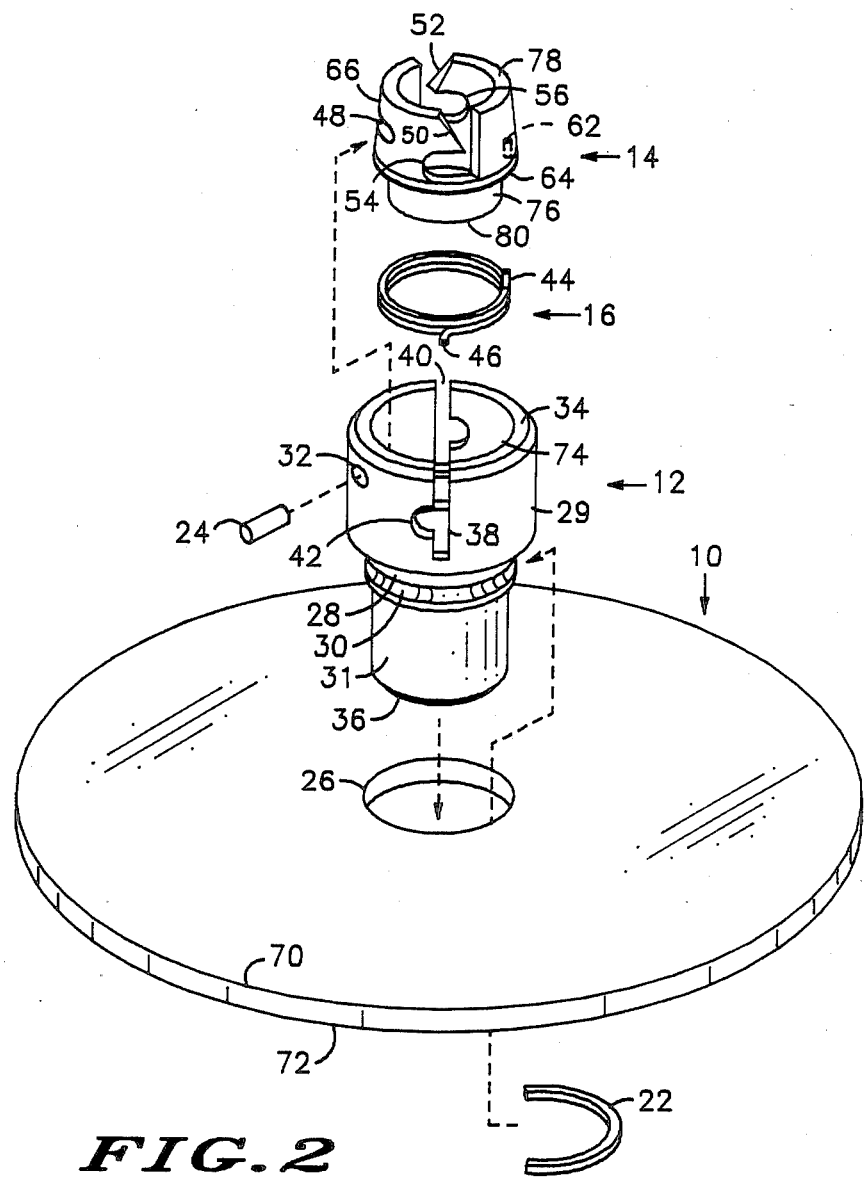
FIG. 2 shows an exploded perspective view of a movement blocking apparatus built according to the teaching of the present invention.

Referring to FIG. 2, an exploded view of the present invention is shown. Base 10 contains a hole 26. A second end 36 of housing 12 is inserted through hole 26 so that a neck portion 31 of housing 12 extends beyond a second base side 72 of base 10. A housing head 29 extends beyond a first base side 70 of base 10. A shoulder portion 28 of housing 12 resides immediately adjacent to base 10 within hole 26, and a retaining ring groove 30 of housing 12 resides adjacent to base 10 at second base side 72.

A retaining snap-ring 22 is inserted into retaining ring groove 30 when housing 12 is installed on base 10. Retaining snap-ring 22 prevents movement of housing 12 away from base 10 in the direction of first base side 70. Housing head 29 exhibits a larger diameter than does hole 26 of housing 10. Thus, housing head 29 prevents housing 12 from moving away from base 10 in the direction of second base side 72. However, housing 12 may freely rotate relative to base 10 within hole 26.

Housing 12 exhibits a generally cylindrical shape that has an axis which substantially coincides with the axis of shaft 20 (see FIG. 1). A first end 34 of housing 12 resides perpendicular to this axis at the end of housing 12 upon which housing head 29 resides. A housing hole 74 extends throughout housing 12 from first end 34 to second end 36. Housing hole 74 exhibits a greater diameter within head portion 29 of housing 12 than in neck portion 31 of housing 12.

Locking ring 14 resides within this larger portion of housing hole 74. Locking ring 14 represents a generally cylindrical hollow ring. The interior diameter of locking ring 14 slightly exceeds the exterior diameter of shaft 20 (see FIG. 1) and apprximately equals an interior diameter of neck portion 31 of housing 12.

Locking ring 14 contains 3 separate sections. A first end 78 of locking ring 14 resides substantially parallel with first end 34 of housing 12 when locking ring 14 is installed within housing hole 74 of housing 12. A ring wall 66 extends from first end 78 to a ring centering lip 64, and a locking ring pedastal 76 extends from ring centering lip 64 to a second end 80 of locking ring 14.

Although the interior diameter of locking ring 14 remains relatively constant throughout locking ring 14, an outside diameter of locking ring 14 varies between first end 78 and second end 80. Ring wall 66 tapers from a smaller diameter immediately adjacent to first end 78 to a larger diameter adjacent to ring centering lip 64. Ring centering lip 64 represents a relatively narrow circular section which exhibits a larger outside diameter than is exhibited by ring wall 66. Finally, the outside diameter of locking ring pedastal 76 is smaller than the diameter of ring centering lip 64 and remains constant throughout locking ring pedastal 76.

Ring centering lip 64 exhibits the largest outside diameter of any portion of locking ring 14. Further, the outside diameter of ring centering lip 64 is slightly smaller than the inside diameter of housing hole 74 within housing head 29. This permits locking ring 14 to freely rotate within housing head 29 of housing 12 yet remain centered within housing hole 74.

The outside diameter of locking ring pedastal 76 permits locking ring 14 to accommodate torsion spring 16. Thus, torsion spring 16 exhibits an inside diameter which is slightly greater than the outside diameter of locking ring pedastal 76. An outside diameter of torsion spring 16 is smaller than the outside diameter of centering lip 64. Thus, an assembly consisting of locking ring 14 and torsion spring 16 fits within housing hole 74 of housing 12. As FIG. 2 shows in phantom, a ring end 44 of torsion spring 16 fits into an axially extending hole 62 bored into centering lip 64 of blocking ring 14. Additionally, a housing end 46 of torsion spring 16 fits into a slit 38 of housing 12. Thus, ends of torsion spring 16 are secured against locking ring 14 and housing 12.

Only the portion of locking ring 14 which resides around the outside of centering lip 64 and at second end 80 contacts housing 12 within housing hole 74. This represents a relatively small amount of surface area compared to the total surface area contained in locking ring 14. This minimal amount of surface area contact improves the reliability of the present invention by reducing the area over which corrosion can occur to bond locking ring 14 to housing 12. Accordingly, locking ring 14 easily rotates within housing hole 74 of housing 12 regardless of substantial corrosive effects. Additionally, materials used for constructing housing 12 and locking ring 14 may resist corrosion. For example, the preferred embodiment of the present invention utilizes either a stainless steel or anodized aluminum housing 12 and locking ring 14.

Ring wall 66 of locking ring 14 contains first and second inclined planes 50 and 52, respectively. Inclined planes 50 and 52 each extend from a left entrance end at first end 78 of locking ring 14 to a right exit end toward centering lip 64 of locking ring 14, when viewed from outside locking ring 14. Of course, those skilled in the art will recognize that inclined planes 50 and 52 may serve their purpose equally well if both inclined planes slope in the opposite direction. Notches 54 and 56 reside immediately adjacent to inclined planes 50 and 52, respectively, axially away from inclined planes 50 and 52 at the exit ends of inclined planes 50 and 52.

Ring wall 66 also contains a slot 48 which extends a predetermined distance around the circumference of ring wall 66. Slot 48 is centrally located between centering lip 64 and first end 78. When locking ring 14 is installed within housing hole 74, a holding or press pin 24 securely fits through a press pin hole 32 in housing head 29 and extends radially inward into slot 48 of locking ring 14. Press pin 24 maintains a positive, tight contact with housing 12 surrounding hole 32. Thus, once installed, press pin 24 tends to remain in place. The length of press pin 24 is selected so that press pin 24 will not extend radially inward through the inside of ring wall 66 of locking ring 14. However, press pin 24 extends into slot 48 of locking ring 14. Consequently, press pin 24 operates in conjunction with the portion of ring wall 66 that surrounds slot 48 to prevent substantial axial movement of locking ring 14 and to prevent unwanted rotation of locking ring 14 relative to housing 12. It is press pin 24 that keeps locking ring 14 retained within housing hole 74 of housing 12.

Referring to FIG. 1, the present invention is shown in a locked position. Accordingly, an entrance end 58 of inclined plane 50 resides in an aligned position relative to to slit 38 of housing 12. Additionally, entrance end 58 of inclined plane 52 resides in an aligned position relative to a second slit 40 of housing 12. Each of slits 38 and 40 and each of inclined planes 50 and 52 reside substantially 180° apart relative to the axis of shaft 20. In this locked position blocking pin 18 may not move either circumferentially or axially due to the combined blocking of housing 12 and locking ring 14. Specifically, locking ring 14 prevents axial movement of pin 18 while slits 38 and 40 prevent circumferential movement. Blocking pin 18 may be removed by sliding pin 18 radially through housing 12 and 14. Removal of blocking pin 18 permits free axial movement of shaft 20 within housing 12 and locking ring 14.

Figure 3:
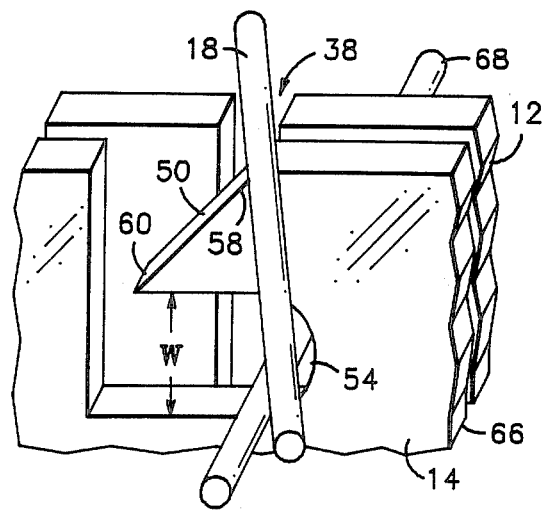
FIG. 3 shows a view of a portion of the present invention from line 3—3 of FIG. 1 prior to the installation of a blocking pin.
Figure 4:
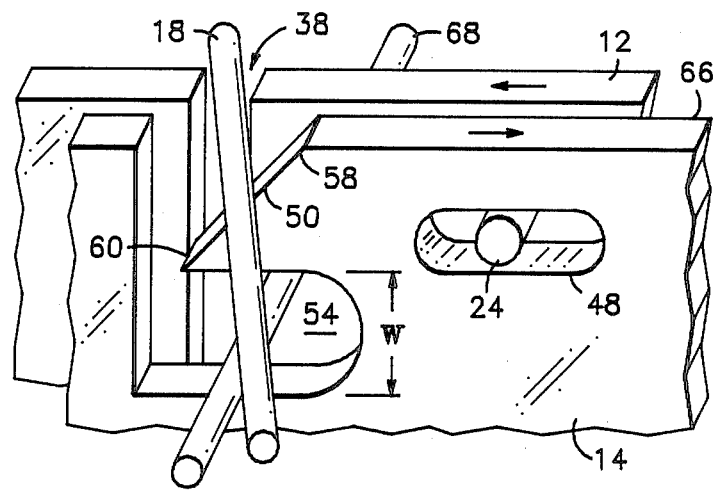
FIG. 4 shows a view of the FIG. 3 portion of the present invention during installation of a blocking pin.
Figure 5:
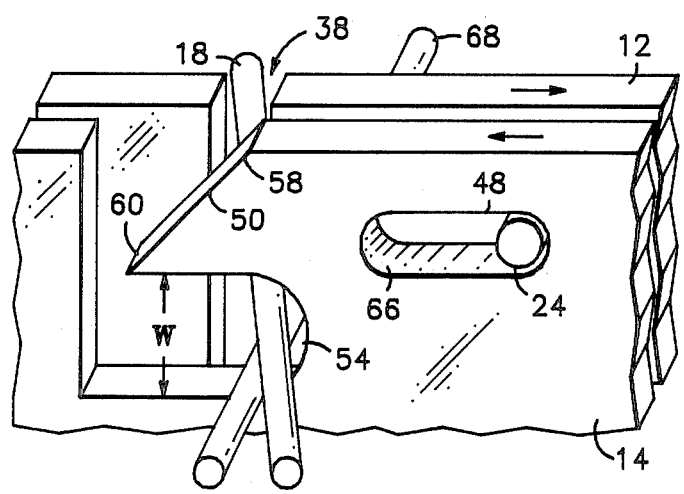
FIG. 5 shows a view of the FIG. 3 portion of the present invention after installation of a blocking pin.

FIGS. 3–5 describe the installation of blocking pin 18. Each of FIGS. 3–5 show a view of inclined plane 50 and slit 38 from inside locking ring 14. Further, as shown in FIGS. 3–5 the present invention permits installation of blocking pin 18 when another blocking pin, such as a blocking pin 68, is currently installed. As shown in FIG. 3, blocking pin 18 is positioned on both slit 38 and entrance end 58 of inclined plane 50. Slit 38 exhibits a width that is greater than the diameter of either blocking pin 18 or 68. As discussed above, entrance end 58 of inclined plane 50 aligns with slit 38 when locking ring 14 is in the locked position. Housing 12 and locking ring 14 rotate as a single unit to aid alignment of blocking pin 18 with both slits 38 and 40 (see FIG. 1) due to the rotatable mounting of housing 12 on base 10.

After blocking pin 18 has been positioned in slit 38 and on inclined plane 50, axial movement of blocking pin 18 within slit 38 causes locking ring 14 to rotate in a first direction relative to housing 12, as shown in FIG. 4. Inclined plane 50 produces the rotation through a directional translation of forces applied to inclined plane 50 by blocking pin 18. Relative movement between locking ring 14 and housing 12 occurs because blocking pin 18 simultaneously holds housing 12 in position as it axially moves within slit 38.

As blocking pin 18 moves within slit 38, it eventually encounters an exit end 60 of inclined plane 50. Locking ring 14 continues to move in the first direction relative to housing 12 so long as blocking pin 18 encounters inclined plane 50. However, continued movement of blocking pin 18 in slit 38 causes blocking pin 18 to encounter notch 54 within locking ring 14.

As blocking pin 18 encounters notch 54, locking ring 14 becomes free to rotate in a second direction, which is opposite to the first direction described above. Torsion spring 16 (see FIG. 2) urges locking ring 14 to move in a second direction relative to housing 12. Consequently, as soon as blocking pin 18 encounters notch 54, spring 16 moves locking ring 14 in the second direction until the locked position is again encountered as shown in FIG. 5. Thus, blocking pin 18 resides within notch 54 of locking ring 14 along with blocking pin 68.

The ability to retain two blocking pins within slit 38 and notch 54 serves the purpose of safely exchanging blocking pins. Accordingly, blocking pin 68 may be removed after blocking pin 18 has been installed, and shaft 20 (see FIG. 1) is blocked from axial movement beyond pins 18 and/or 68 throughout the pin-exchanging process.

In order to accommodate two blocking pins at one time, notch 54 exhibits a predetermined width W which is greater than the sum of the diameters of blocking pins 18 and 68. Additionally, a notch 42 is supplied in housing 12 (see FIG. 2) adjacent to slit 38. Notch 42 is sufficiently large to simultaneously accommodate both of blocking pins 18 and 68.

FIGS. 4 and 5 additionally show the operation of notch 48 of locking ring 14 in cooperation with press pin 24. FIG. 5 shows the relative positions of press pin 24 and slot 48 when locking ring 14 is in the locked position. In the locked position press pin 24 contacts ring wall 66 within slot 48 and prevents further movement of locking ring 14 in the direction urged by torsion spring 16 (see FIG. 2). Thus, proper alignment of entrance end 58 of inclined plane 50 is insured because press pin 24 blocks movement of entrance end 58, past slit 38 of housing 12. As shown in FIG. 4, slot 48 extends along the circumference of locking ring 14 sufficiently far so that blocking pin 18 may encounter exit end 60 of inclined plane 50 before rotation of locking ring 14 causes press pin 24 to contact another portion of ring wall 66.

In summary, the present invention permits a relatively easy installation of blocking pin 18 compared to threading a pin through holes. In the present invention blocking pin 18 is installed by an axial movement of blocking pin 18 within slit 38. This configuration permits a lower profile because housing head 29 (see FIG. 2) need not extend a great distance beyond base 10. Further, the present invention represents a simple and reliable device which withstands corrosion and environmental extremes as discussed above.

The foregoing description uses a preferred embodiment to illustrate the present invention. However, those skilled in the art will recognize that changes and modifications may be made in this embodiment without departing from the scope of the present invention. For example, one of ordinary skill in the art would recognize that the relative positions of locking ring 14 and housing 12 are interchangeable. Further, other devices, such as a wire, may serve as a blocking pin. Additionally, one skilled in the art will recognize that particular applications permit a wide variation in selection of materials, spring tensions, and dimensions. These and other modifications obvious to those skilled in the art are intended to be included within the scope of this invention.

What is claimed is:

1. An apparatus for selectively blocking movement of a shaft in a direction of a shaft axis, the apparatus comprising:
   a housing mounted to be substantially concentric with the shaft, said housing having a first end residing substantially perpendicular to the direction of the shaft axis and an axial slit extending from the first end of said housing;
   a locking ring concentrically and rotatably mounted relative to said housing, said locking ring having a first end residing substantially perpendicular to the direction of the shaft axis and said locking ring being formed to have an inclined plane portion extending from an entrance end at the first end of said locking ring to an exit end, and a notch located adjacent to the exit end of the inclined plane, axially away from the first end of said locking ring;
   a resilient member coupled to said housing and locking ring to urge said locking ring to rotate relative to said housing; and
   a blocking pin located within said notch to block axial movement of the shaft past said pin.

2. An apparatus as claimed in claim 1 wherein:
   said housing has a second axial slit extending from the first end of said housing; and
   said locking ring has a second inclined plane portion extending from an entrance end at the first end of said locking ring to an exit end, and a second notch portion located adjacent to the exit end of the second inclined plane, axially away from the first end of said locking ring, said housing second slit and the entrance end of said locking ring second inclined plane being positioned so that alignment of the entrance end of the inclined plane with the slit causes the entrance end of the second inclined plane to be aligned with the second slit.

3. An apparatus as claimed in claim 2 wherein said housing slit and second slit reside approximately 180 degrees apart relative to a center about which said housing, said locking ring, and the shaft are concentric.

4. An apparatus as claimed in claim 1 wherein said housing slit exhibits a first predetermined width perpendicular to the axis and said locking ring notch exhibits a second predetermined width along the axis, and said blocking pin having a diameter smaller than the first and second predetermined widths.

5. An apparatus as claimed in claim 4 wherein the diameter of said blocking pin is less than one-half of the second predetermined width.

6. An apparatus as claimed in claim 1 additionally comprising a base wherein said housing is rotatably attached to said base.

7. An apparatus as claimed in claim 1 wherein said resilient member comprises a torsion spring having a first end secured to said housing and a second end secured to said locking ring.

8. An apparatus as claimed in claim 1 wherein said locking ring has a slot extending circumferentially for a predetermined distance and said apparatus additionally comprises a holding pin affixed to the housing and extending radially into said locking ring slot.

9. An apparatus as claimed in claim 8 wherein said locking ring slot is positioned on said locking ring so that said holding pin blocks movement in a rotational direction urged by said resilient member beyond a position where said locking ring inclined plane entrance end aligns with said housing slit.

10. An apparatus as claimed in claim 1 wherein:
    said housing has a substantially cylindrical opening therein extending into said housing from said housing first end; and
    said locking ring resides within said opening.

11. An apparatus as claimed in claim 10 wherein in an outside diameter dimension of said locking ring tapers from a smaller diameter at said locking ring first end to a larger diameter.

12. A method of blocking movement of a shaft in a direction of a shaft axis utilizing a housing having an axial slit therein, a locking ring having an inclined plane portion residing adjacent to a notch, and a blocking pin, said method comprising the steps of:
    rotating the locking ring in a first direction relative to the housing by axial movement of the blocking pin in the housing slit simultaneously with axial movement of the blocking pin against the inclined plane portion of the locking ring;
    positioning the blocking pin in the locking ring notch;
    rotating the locking ring in a second direction relative to the housing by action of a resilient member on the locking ring and housing;
    preventing substantial axial movement of the blocking pin by retaining the blocking pin within the notch portion of the locking ring; and
    preventing substantial circumferential movement of the blocking pin by retaining the blocking pin within the housing slit.

13. A method as claimed in claim 12 wherein said rotating in a first direction step additionally comprises the step of axially moving the blocking pin in a second axial housing slit simultaneously with moving the blocking pin against a second inclined plane portion of the locking ring.

14. A method as claimed in claim 12 additionally comprising the steps of:
    inserting a second blocking pin into the locking ring notch by axial movement of the second blocking pin in the housing slit, said inserting step occurring after said positioning step; and
    removing the blocking pin of said positioning step from the locking ring notch and housing slit.

15. A method as claimed in claim 12 additionally comprising the step of rotatably attaching the housing to a base.

16. A method as claimed in claim 12 wherein the inclined plane portion of the locking ring has an entrance end and the method additionally comprises the step of blocking movement of the locking ring in the second direction relative to the housing beyond a position where the entrance end of the inclined plane portion of the locking ring aligns with the slit of the housing.

17. An apparatus for blocking movement of a shaft in a direction of a shaft axis, the apparatus comprising:
    a housing mounted to be substantially concentric with the shaft, said housing having a first end residing substantially perpendicular to the direction of the shaft axis and first and second axial slits residing approximately 180 degrees apart and each extending from the first end of said housing;
    a locking ring concentrically and rotatably mounted within said housing, said locking ring having a first end residing substantially perpendicular to the direction of the shaft axis and being formed to have first and second inclined plane portions residing approximately 180 degrees apart and each extending from an entrance end at the first end of said locking ring to an exit end, and first and second notches each exhibiting a minimum predetermined width in a direction of the axis and being located adjacent to the exit ends of the first and second inclined planes, respectively, said locking ring having an outer diameter which tapers from a smaller diameter at the first end of said locking ring to a larger diameter;
    a torsion spring having a first end secured to said housing and a second end secured to said locking ring; and
    a blocking pin having a diameter less than the predetermined width of said locking ring first and second notches, said pin residing in said locking ring first and second notches to block axial movement of the shaft past said pin.

* * * * *